United States Patent
Chiang

(10) Patent No.: US 7,085,491 B2
(45) Date of Patent: Aug. 1, 2006

(54) ADJUSTABLE OPTICAL APPARATUS ADAPTER

(75) Inventor: Ching Hsi Chiang, Taipei (TW)

(73) Assignee: Long Perng Co., Ltd., Taipei (TW)

( * ) Notice: Subject to any disclaimer, the term of this patent is extended or adjusted under 35 U.S.C. 154(b) by 112 days.

(21) Appl. No.: 10/885,764

(22) Filed: Jul. 8, 2004

(65) Prior Publication Data

US 2005/0213959 A1 Sep. 29, 2005

(30) Foreign Application Priority Data

Mar. 29, 2004 (TW) ............................... 93108571 A

(51) Int. Cl.
*G03B 17/48* (2006.01)
*G02B 23/00* (2006.01)
*G02B 21/36* (2006.01)

(52) U.S. Cl. ...................................... 396/432; 396/428

(58) Field of Classification Search ................ 396/422, 396/428, 432, 419, 429
See application file for complete search history.

(56) References Cited

U.S. PATENT DOCUMENTS

| | | | | |
|---|---|---|---|---|
| 3,563,154 A | * | 2/1971 | Henning .................. | 248/187.1 |
| D382,288 S | * | 8/1997 | Usui ......................... | D16/245 |
| 6,019,326 A | * | 2/2000 | Baerwolf et al. ......... | 248/177.1 |
| 6,357,937 B1 | * | 3/2002 | Stratton, Jr. ................ | 396/428 |
| 6,717,727 B1 | * | 4/2004 | Barziza ...................... | 359/399 |
| 2002/0197075 A1 | * | 12/2002 | Crockett ..................... | 396/429 |
| 2005/0036782 A1 | * | 2/2005 | Claudi et al. ............... | 396/428 |
| 2005/0078956 A1 | * | 4/2005 | Pernstich et al. ........... | 396/428 |

* cited by examiner

*Primary Examiner*—W. B. Perkey
*Assistant Examiner*—Rishi Suthar
(74) *Attorney, Agent, or Firm*—Rosenberg, Klein & Lee

(57) ABSTRACT

An adjustable optical apparatus adapter is disclosed to include a camera platform provided with a mounting screw and a wing nut for securing a camera to the camera platform, a telescope holder for holding a telescope, a holding down frame controlled by a lock screw to hold down a telescope in the telescope holder, and a camera platform lock mounted in the a horizontal sliding slot in camera platform and a vertical sliding slot in telescope holder for locking the camera platform to the telescope holder after position adjustment of the camera platform horizontally and vertically relative to the telescope holder to have the loaded telescope at the telescope holder in axial alignment with the loaded camera at the camera platform.

11 Claims, 14 Drawing Sheets

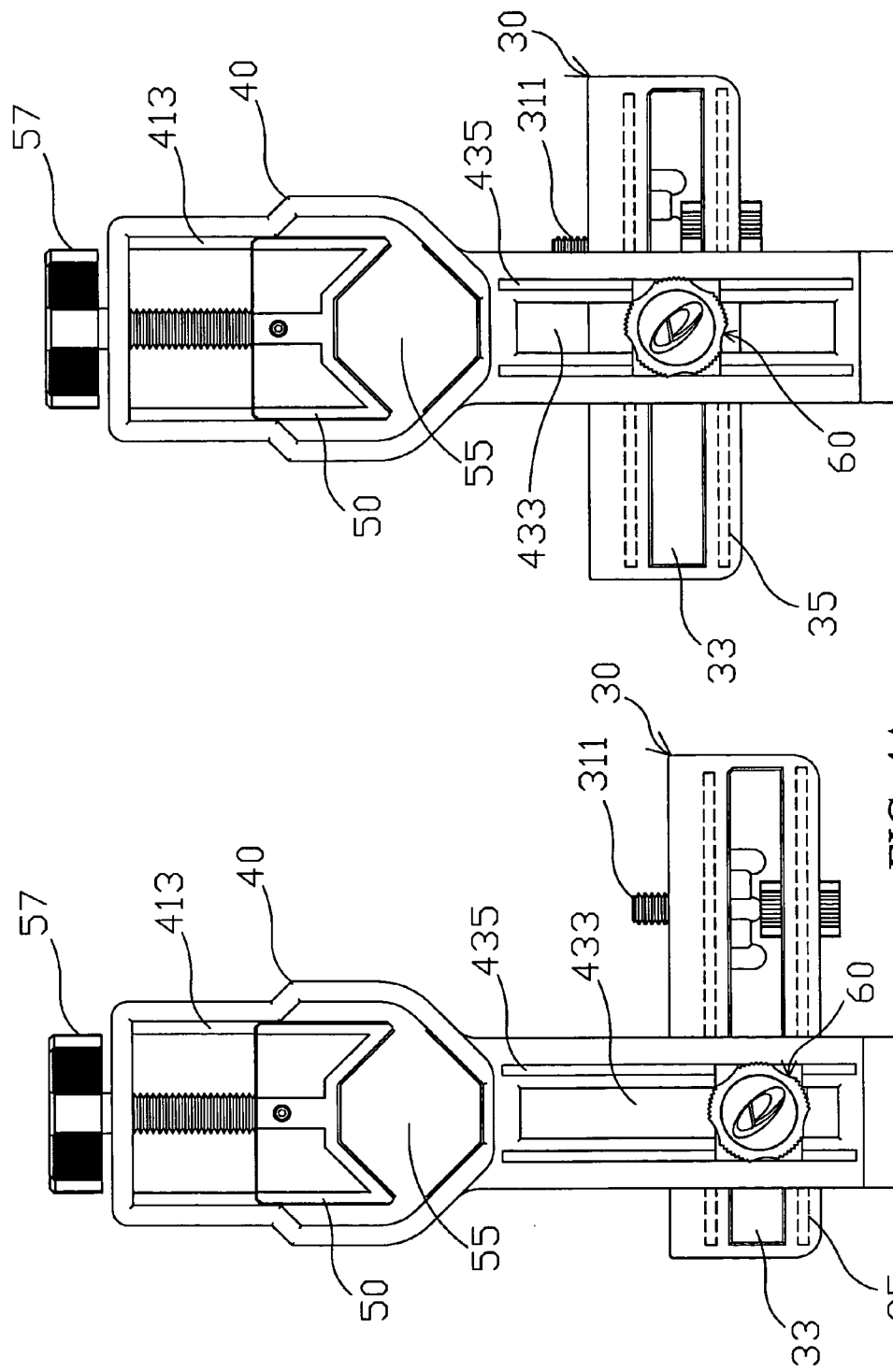

ADJUSTABLE OPTICAL APPARATUS ADAPTER

BACKGROUND OF THE INVENTION

1. Field of the Invention

The present invention relates to an optical apparatus adapter for coupling a telescope to a camera, and more particularly to an adjustable optical apparatus adapter that can be adjusted horizontally as well as vertically to fit different types and models of telescopes and cameras.

2. Description of Related Art

Following prosperity of the society, people pay more attention to recreational life. In consequence, photographic activities have become popular. Due to limited amplification, it is difficult to pick up the image of a remote scene with a camera. In this case, a telescope should be used. When using a camera with a telescope, an adapter is necessary to couple the telescope to the camera, keeping the eyepiece of the telescope in axial alignment with the lens of the camera.

FIG. 1A shows a conventional optical apparatus adapter for coupling a telescope to a camera. According to this design, the optical apparatus adapter 10 is shaped like a barrel having an outer thread 11 at one end for fastening to a camera 15 and an inner thread 13 at the other end for fastening to the outer thread 23 around the periphery of the eyepiece of a telescope 20 (see also FIG. 1B). By means of the telescope 20, the image of a remote scene can be mapped onto the image sensor 151 of the camera 15. This design of optical apparatus adapter is functional, however it fits only a particularly designed telescope and a particularly designed camera. A telescope without an outer thread for threading into the inner thread 13 of the optical apparatus adapter or a camera without an inner thread for threading onto the outer thread 11 of the optical apparatus adapter cannot be used with the optical apparatus adapter.

SUMMARY OF THE INVENTION

The present invention has been accomplished under the circumstances in view. It is therefore one object of the present invention to provide an adjustable optical apparatus adapter, which can be adjusted to couple a telescope to a camera in an axially aligned status. It is anther object of the present invention to provide an adjustable optical apparatus adapter, which can be conveniently adjusted to fit different types and models of telescopes and cameras. It is still another object of the present invention to provide an adjustable optical apparatus adapter, which is easy and inexpensive to manufacture.

To achieve these and other objects of the present invention, the adjustable optical apparatus adapter comprises a camera platform adapted to carry a camera, the camera platform comprising a mounting screw adapted to affix a camera to the camera platform, and at least one horizontal sliding slot; a telescope holder adapted to hold a telescope, the telescope holder having an upper part forming a holder frame and a lower part defining a vertical sliding slot the holder frame having a screw hole vertically extended in a top side thereof; a lock screw threaded into the screw hole of the holder frame and adapted to lock a telescope to the holder frame; and a camera platform lock mounted in the at least one horizontal sliding slot of the camera platform and the vertical sliding slot of the telescope holder for enabling the camera platform to be moved vertically relative to the telescope holder along the vertical sliding slot and the telescope holder to be moved horizontally relative to the camera holder along the at least one horizontal sliding slot and adapted to lock the camera platform to the telescope holder.

BRIEF DESCRIPTION OF THE DRAWINGS

FIG. 4A is a schematic front view of the present invention.

FIG. 4B is similar to FIG. 4A but showing the relative position between the camera platform and the telescope holder adjusted.

DETAILED DESCRIPTION OF THE PREFERRED EMBODIMENT

Figure 1A:
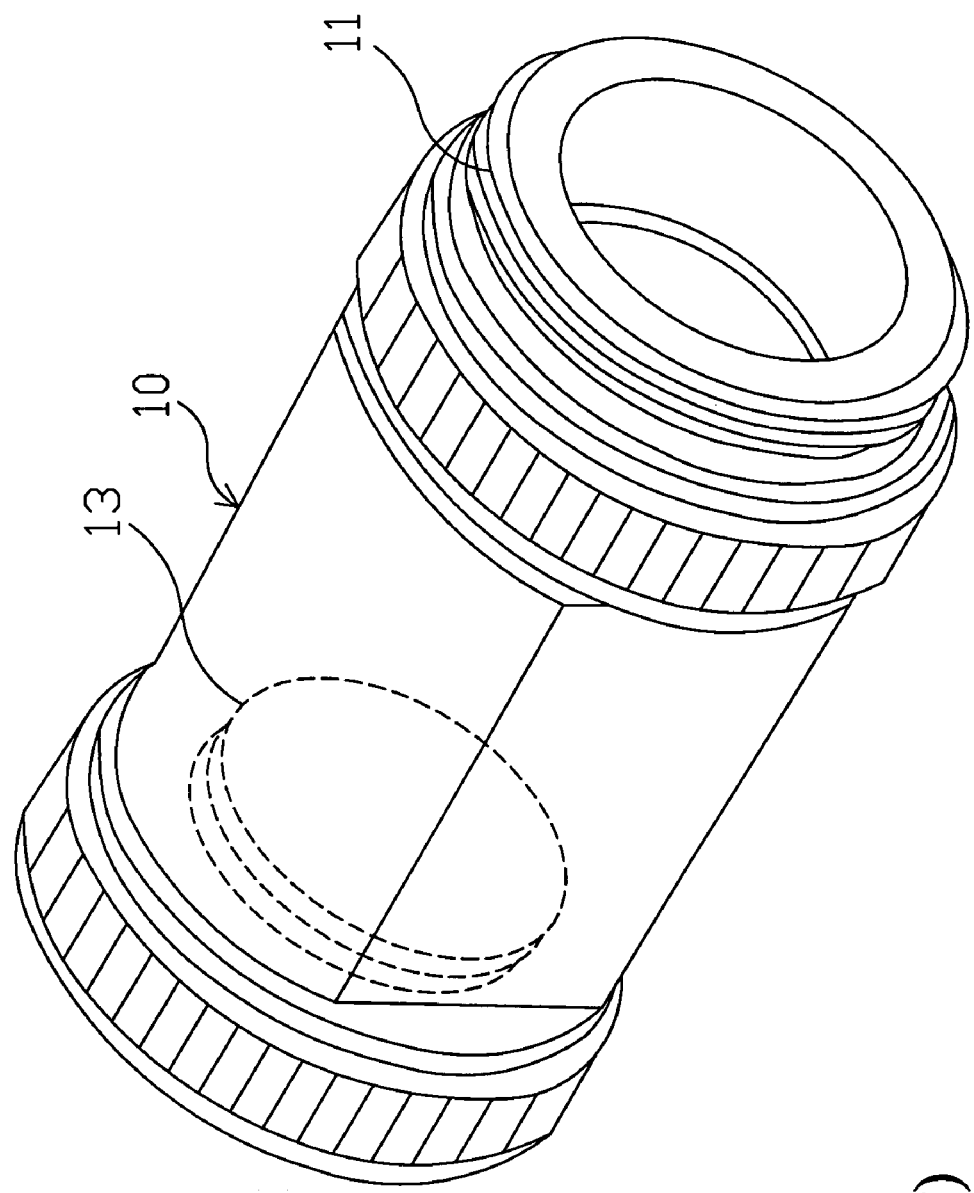
FIG. 1A is an elevational view of an optical apparatus adapter according to the prior art.
Figure 1B:
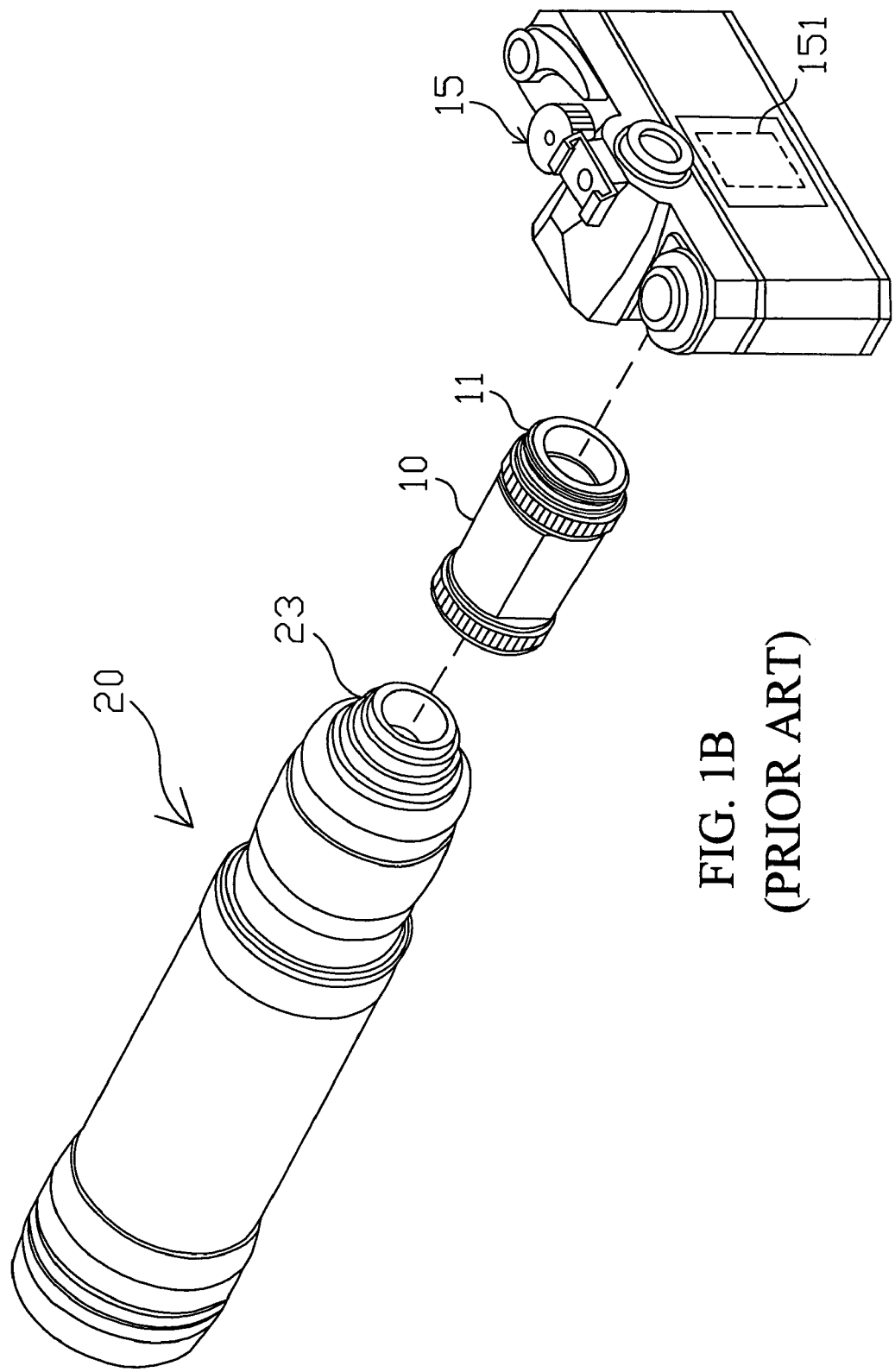
FIG. 1B is an exploded view showing the relative positioning structure between the optical apparatus adapter and the telescope and the camera according to the prior art.
Figure 2A:
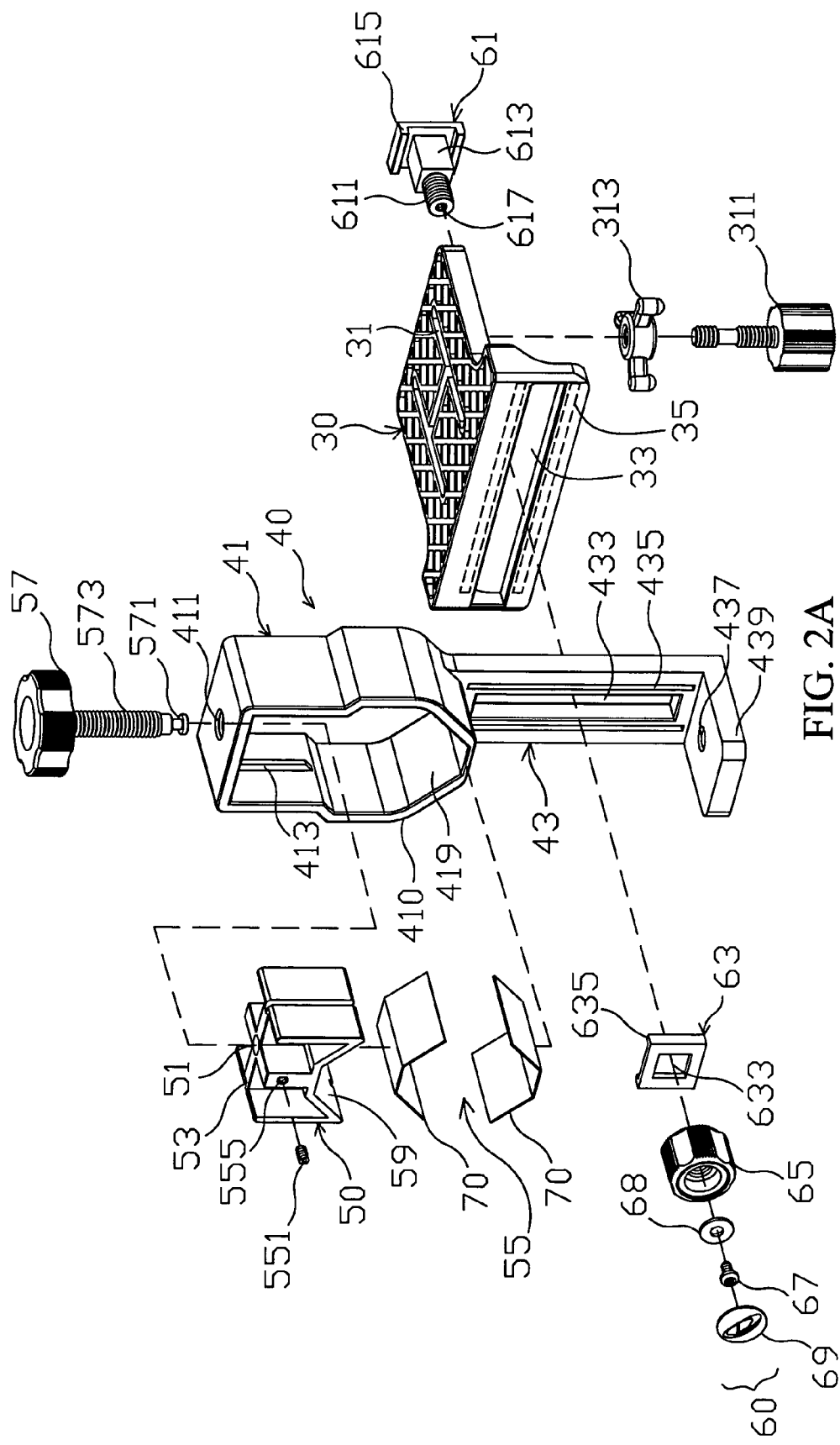
FIG. 2A is an adjustable exploded view of an optical apparatus adapter according to the present invention.
Figure 2B:
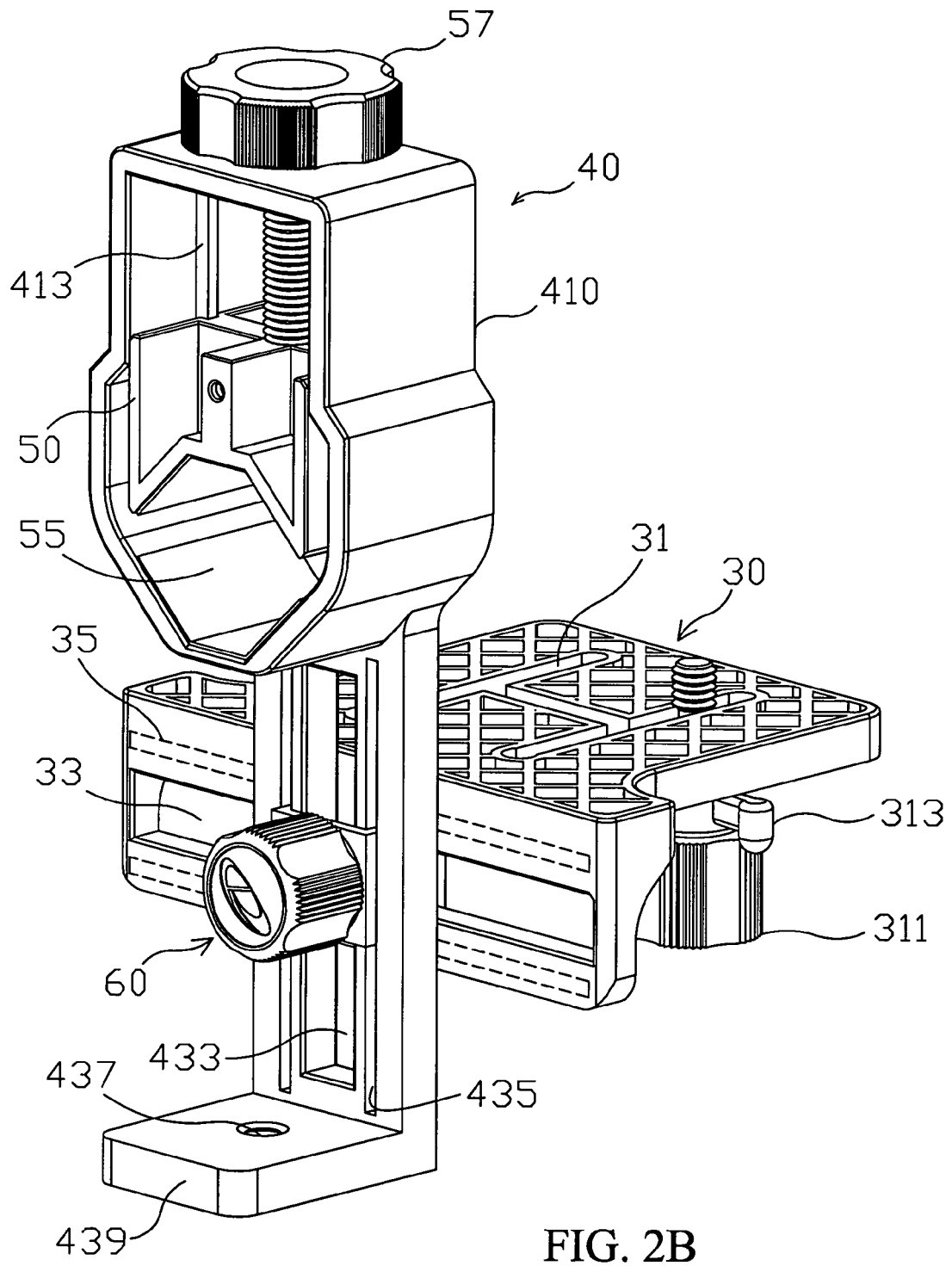
FIG. 2B is a perspective assembly view in an enlarged scale of the adjustable optical apparatus adapter shown in FIG. 2A.
Figure 3A:
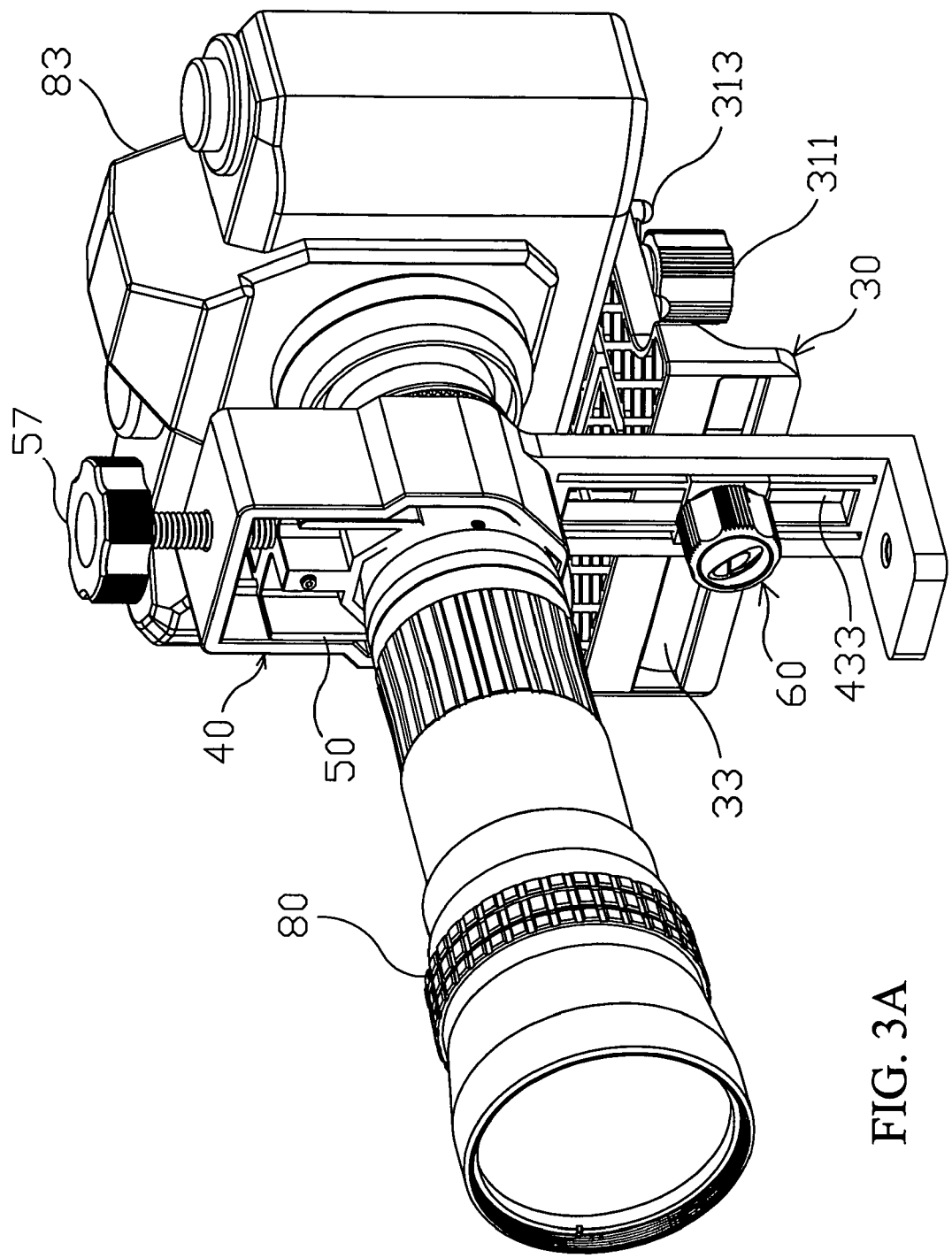
FIG. 3A is an applied view of the present invention, showing a telescope and a camera installed in the adjustable optical apparatus adapter according to the present invention.
Figure 3B:
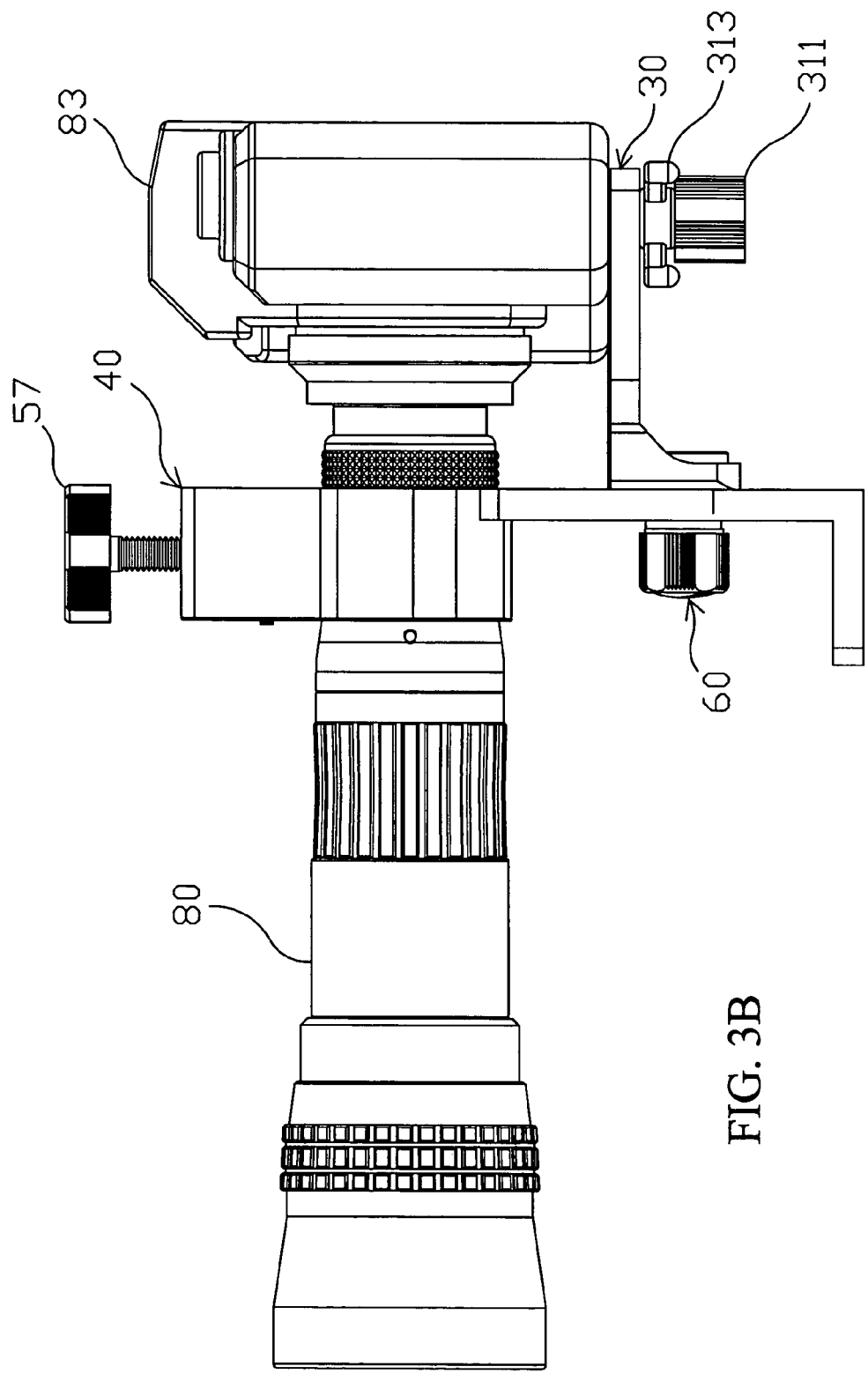
FIG. 3B is a side view of FIG. 3A.

Referring to FIGS. 2A, 2B, 3A, and 3B, an adjustable optical apparatus adapter in accordance with one embodiment of the present invention is shown comprised of a camera platform 30, a telescope holder 40, a holding down frame 50, and a camera platform lock 60.

The camera platform 30 comprises at least one vertical slot 31 cut through the top and bottom walls thereof, a horizontal sliding slot 33 in one vertical sidewall thereof, and two horizontal sliding grooves 35 arranged in parallel at two sides along the horizontal sliding slot 33. Further, a mounting screw 311 is threaded into a wind nut 313 and inserted through the at last one vertical slot 31 to fix a photographic apparatus, for example, a camera 83 to the camera platform 30.

The telescope holder 40 has an upper part 41 and a lower part 43. The upper part 41 comprises a holder frame 410, a top screw hole 411 vertically formed in the top side of the holder frame 410, and at least one, for example, two coupling rails 413 formed integral with the inside wall of the holder frame 410 at two sides. The lower part 43 comprises a vertical sliding slot 433, two vertical sliding grooves 435 arranged in parallel at two sides of the vertical sliding slot 433, a bottom mounting plate 439, and a screw hole 437 vertically formed in the bottom mounting plate 439.

The holding down frame 50 comprises a top mounting hole 51, at one, for example, two coupling grooves 53 symmetrically disposed at two opposite lateral sides corresponding to the coupling rails 413 of the telescope holder 40, and a front screw hole 555 in communication with the top mounting hole 51.

The camera platform lock 60 is comprised of a base block 61, a slide 63, and a locknut 65. The base block 61 comprises at least one, for example, two horizontal coupling flanges 615 arranged in parallel at the front side and respectively coupled to the horizontal sliding grooves 35 of the camera platform 30, a polygonal shoulder 613 forwardly extended from the front side and inserted into the horizontal sliding slot 33 of the camera platform 30, a front screw rod 611 axially forwardly extended from the polygonal shoulder 613 and inserted through the vertical sliding slot 433 of the telescope holder 40, and a screw hole 617 axially formed in the front end of the front screw rod 611. The slide 63 has a center opening 633 fitting the cross section of the polygonal shoulder 613 of the base block 61, and two coupling flanges 635 arranged in parallel at two sides of the center opening 633 and respectively coupled to the vertical sliding grooves 435 of the telescope holder 40. The locknut 65 is threaded onto the front screw rod 611 to lock the camera platform 30 to the telescope holder 40 at the desired elevation.

After installation of the a mounting screw 311 in one vertical slot 31 of the camera platform 30 to fix a camera 83 to the camera platform 30, the user can turn the wind nut 313 to lock/unlock the camera 83. Further, the user can move the mounting screw 311 in the at least one vertical slot 31 to the desired location subject to the model of the photographic apparatus to be used. Therefore, the camera platform 30 can hold any of a variety of cameras.

After coupling of the coupling grooves 53 of the holding down frame 50 to the coupling rails 413 of the telescope holder 40, a holding down frame 50 define with the holder frame 410 a clamping hole 55 for holding down a telescope 80.

A lock screw 57 is provided to move the holding down frame 50 in the telescope holder 40, and to further adjust the size of the clamping hole 55 so as to lock/unlock the telescope 80. The lock screw 57 has a threaded shank 573 threaded into the top screw hole 411 of the holder frame 410 of the telescope holder 40 and inserted into the top mounting hole 51 of the holding down frame 50, and a locating groove 571 extended around the periphery of the front end of the threaded shank 573. A tightening up screw 551 is threaded into the front screw hole 555 of the holding down frame 50 and engaged into the locating groove 571 to fix the holding down frame 50 to the lock screw 57. When rotating the lock screw 57 forwards or backwards in the top screw hole 411 of the holder frame 410, the holding down frame 50 is moved vertically upwards or downwards with the lock screw 57 along the coupling rails 413 of the telescope holder 40 to adjust the size of the clamping hole 55 subject to the size of the telescope 80. Therefore, the telescope holder 40 can hold any of a variety of telescopes. Rubber pads 70 are respectively provided at the bottom wall 59 of the holding down frame 50 and the inner bottom wall 419 of the holder frame 410 to protect the telescope 80 and to prevent slipping of the telescope 80.

The aforesaid camera platform lock 60 further comprises a screw 67, a washer 68, and an ornamental cap 69. The screw 67 is inserted through the washer 68 and then threaded into the screw hole 617 of the base block 61 to prevent falling of the lock nut 65 from the base block 61. The ornamental cap 69 is capped on the lock nut 65 to keep the screw 67 and the washer 68 from sight. The ornamental cap 69 may be marked with a company's logo or the like.

Further, by means of the screw hole 437, the bottom mounting plate 439 of the telescope holder 40 can be fastened to the camera platform of a tripod (not shown). After installation of the telescope holder 40 in a tripod, a telescope 80 can be fastened to the telescope holder 40 and firmly held down by the holding down frame 50, and a camera 83 can be affixed to the camera platform 30, keeping the lens of the camera 83 aimed at the eyepiece of the telescope 80.

Referring to FIGS. 4A and 4B and FIG 2A again, the polygonal shoulder 613 of the base block 61 fits the horizontal sliding slot 33 of the camera platform 30. Therefore, the base block 61 is prohibited from rotary motion in the horizontal sliding slot 33 of the camera platform 30 but can be moved along the horizontal sliding slot 33 of the camera platform 30 to adjust the relative position between the camera 83 at the camera platform 30 and the telescope 80 at the telescope holder 40 horizontally and moved along the vertical sliding slot 433 of the telescope holder 40 to adjust the relative position between the camera 83 at the camera platform 30 and the telescope 80 at the telescope holder 40 vertically, keeping the lens of the camera 83 in axial alignment with the eyepiece of the telescope 80.

Figure 5A:
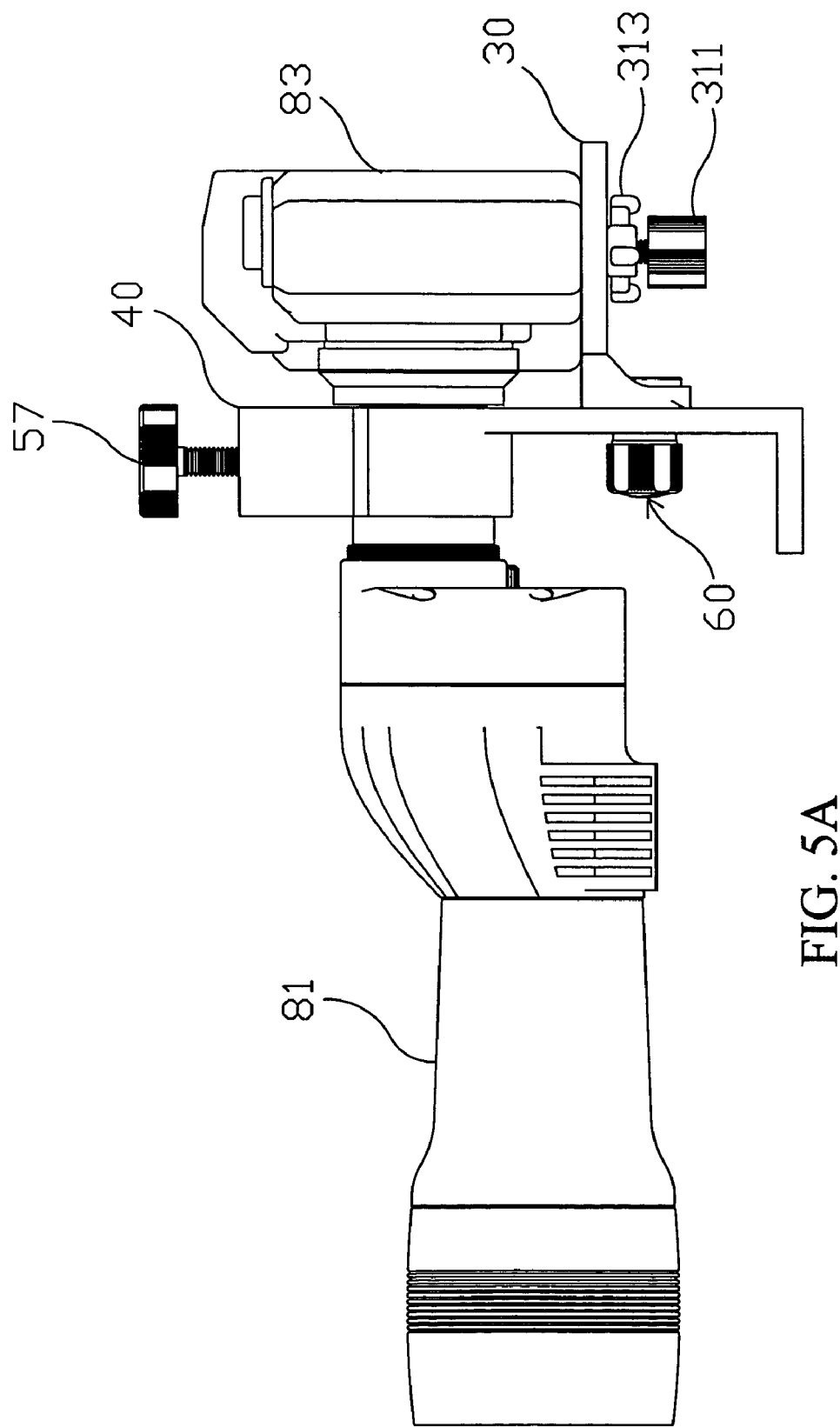
FIG. 5A is a schematic side view showing another application example of the present invention.
Figure 5B:
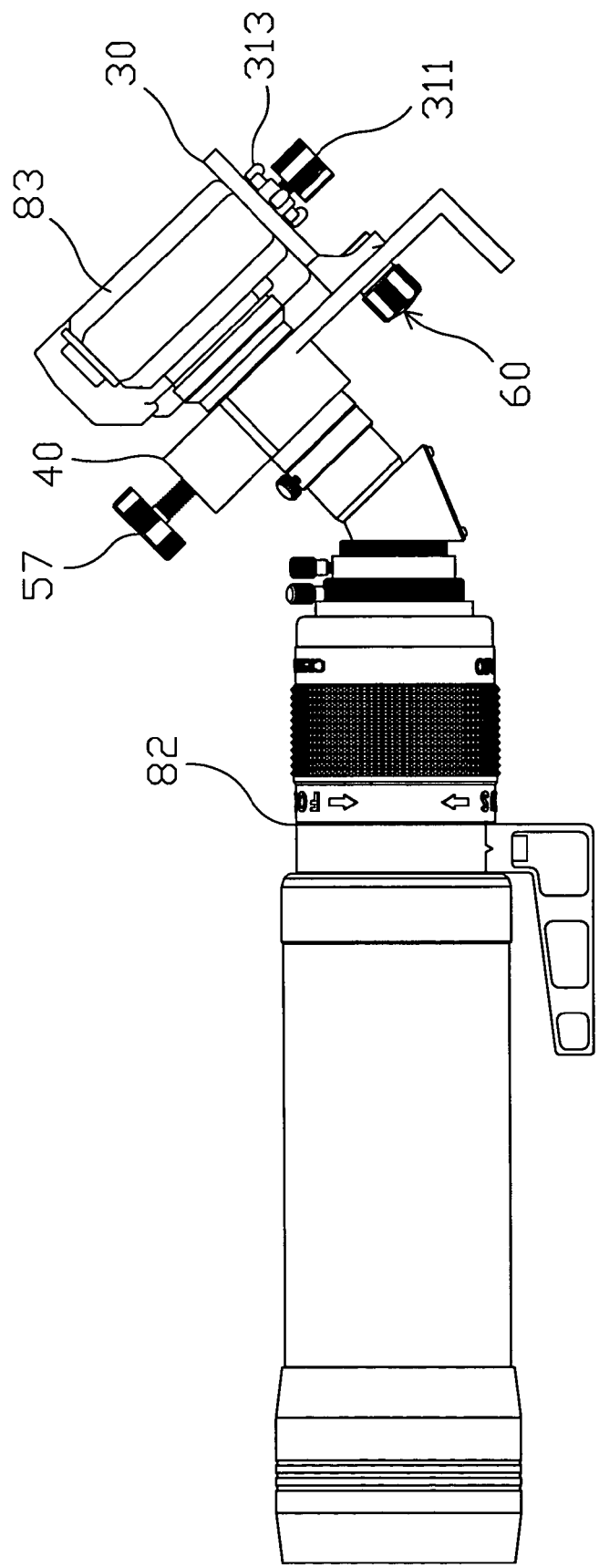
FIG. 5B is a schematic side view showing still another application example of the present invention.
Figure 6A:
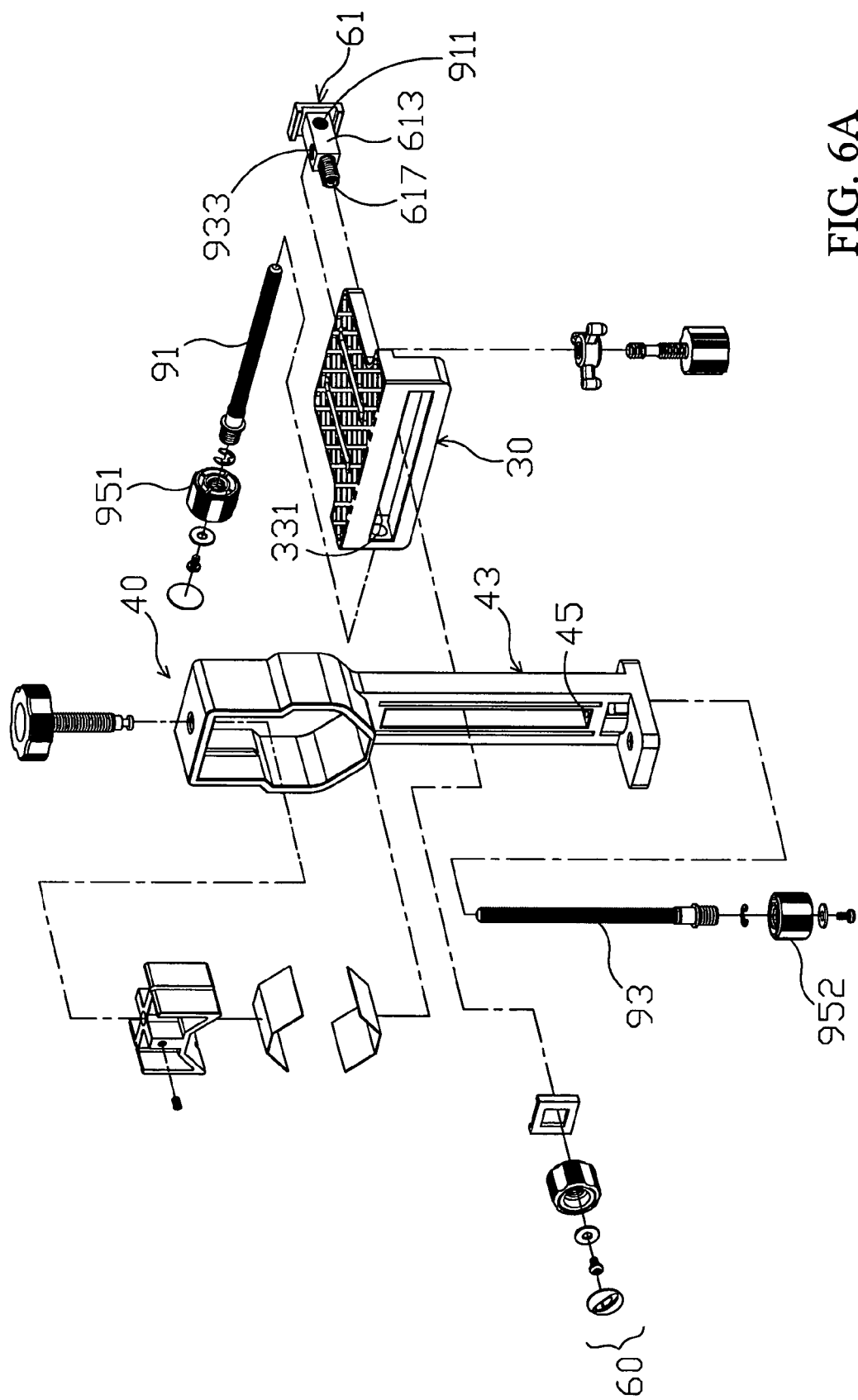
FIG. 6A is an exploded view of an alternate form of the adjustable optical apparatus adapter according to the present invention.
Figure 6B:
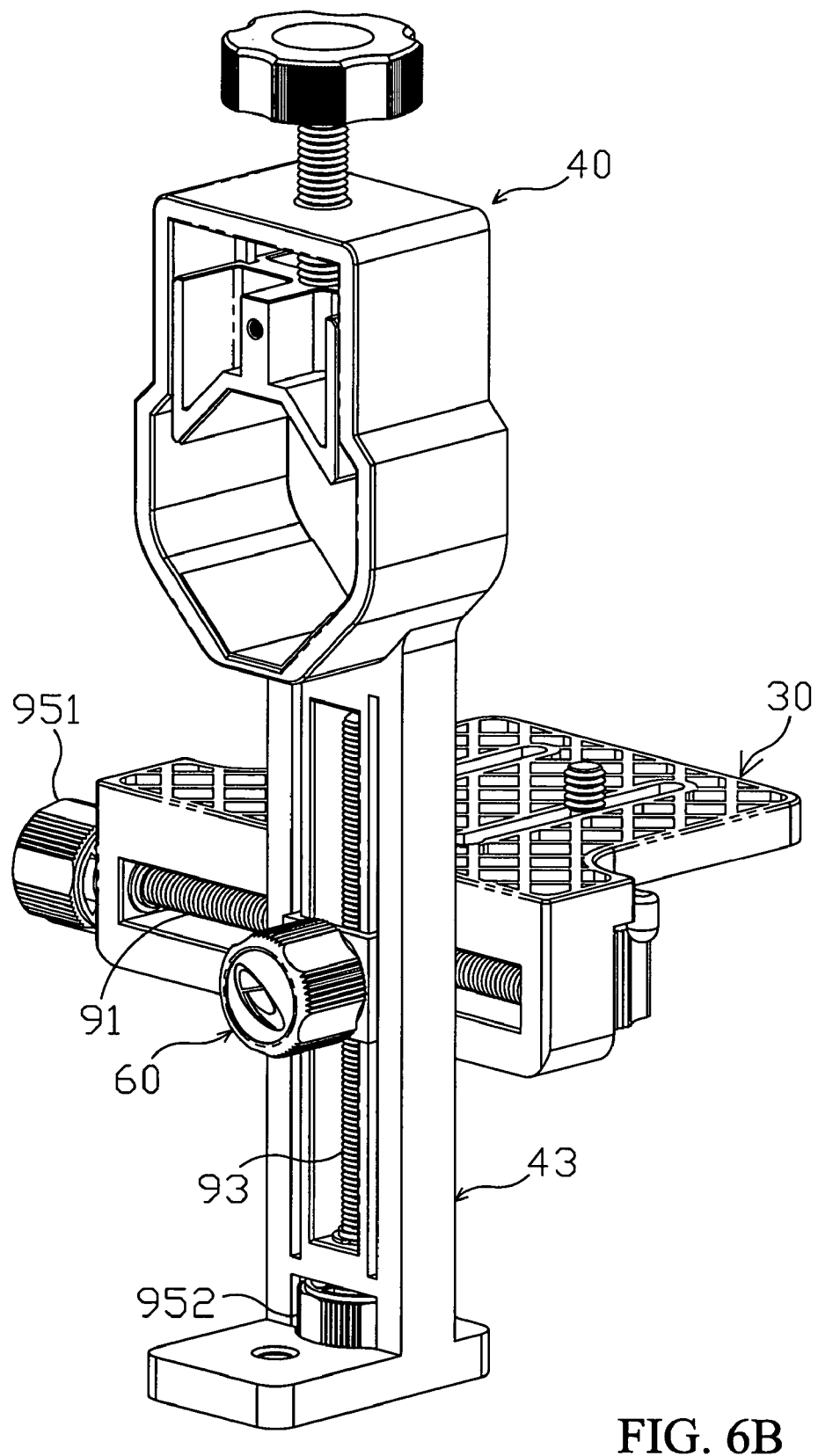
FIG. 6B is an assembly view in an enlarged scale of FIG. 6A.
Figure 6C:
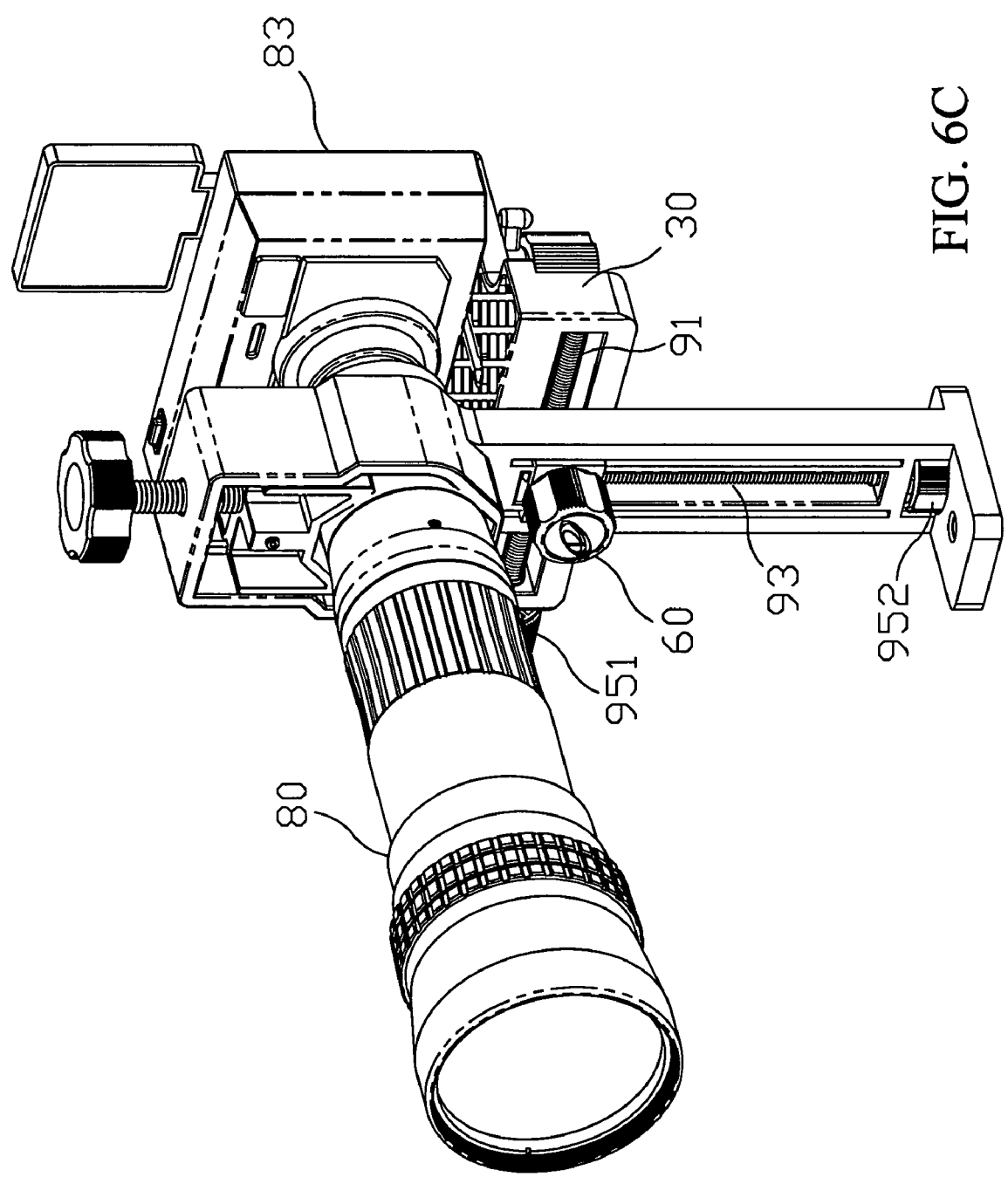
FIG. 6C~6E show the assembly views of the combination by optical apparatus and the present invention.
Figure 6D:
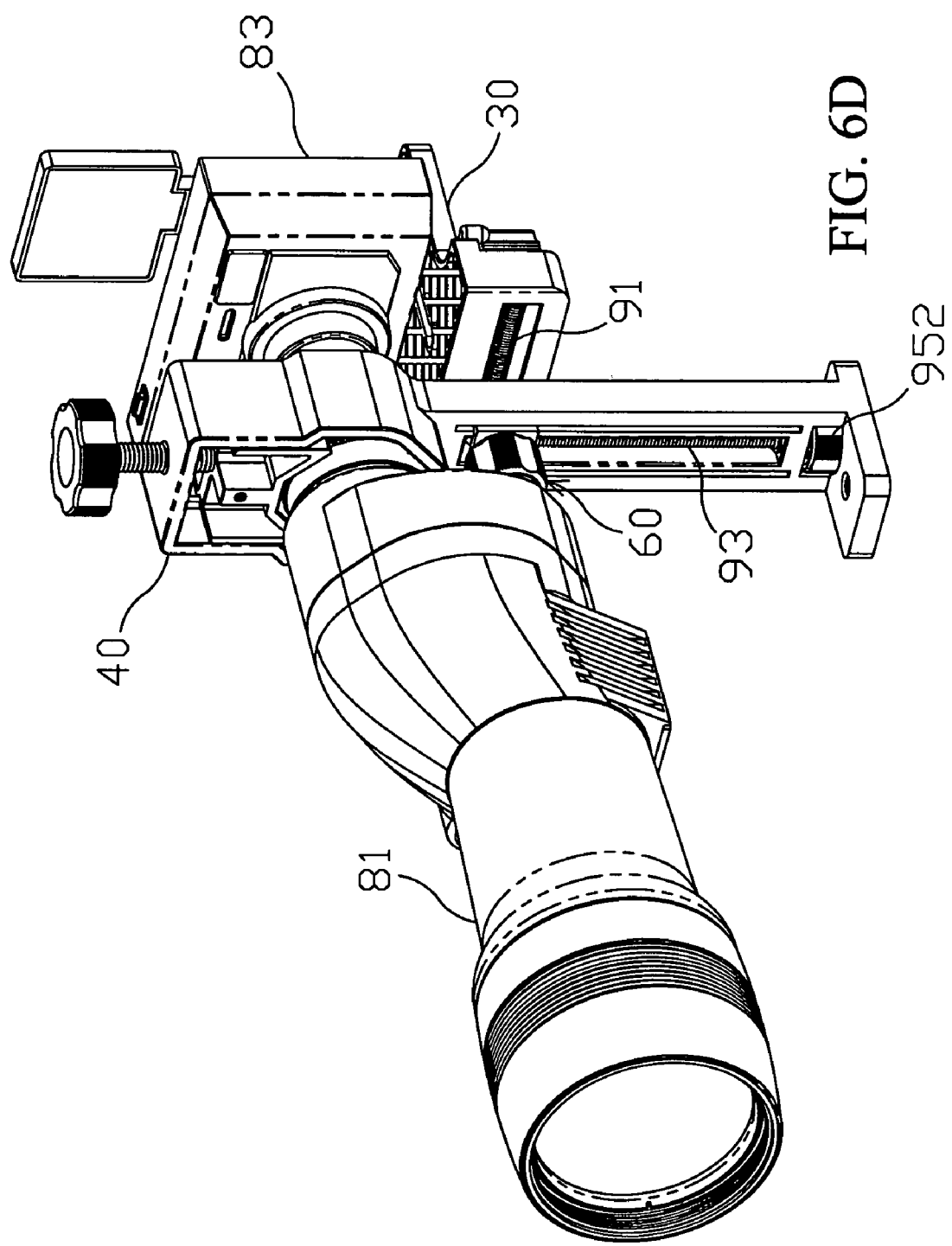
Figure 6E:
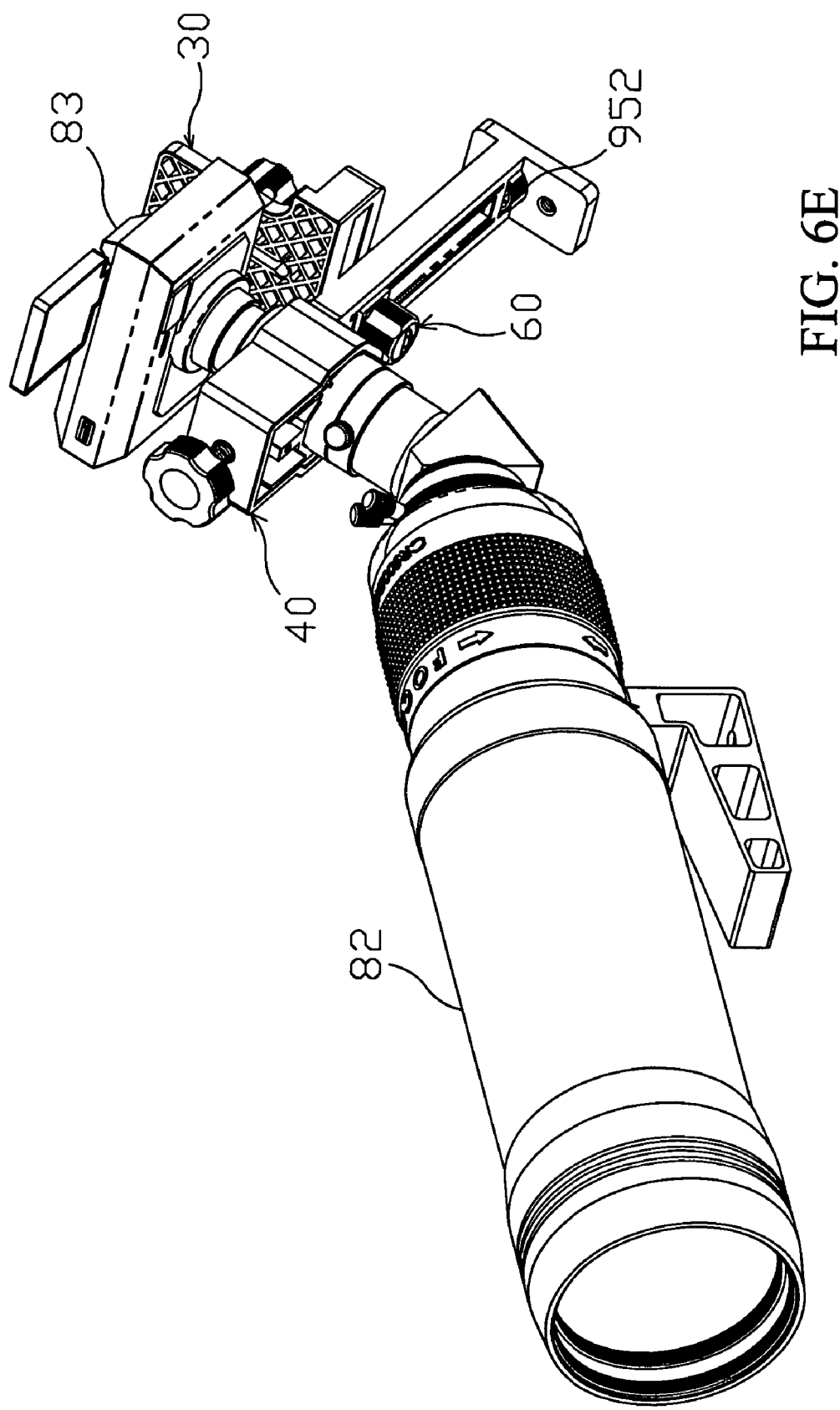

Referring to FIGS. 5A and 5B, the telescope holder 40 can hold any of a variety of different models of telescopes, for example, the telescope 81 shown in FIG. 5A or the telescope 83 shown in FIG. 5B, or a periscope (not shown).

FIGS. 6A to 6E show an alternate form of the present invention. According to this embodiment, the base block 61 has a horizontally extended screw hole 911 and a vertically extended screw hole 933; the camera platform 30 has a horizontally extended insertion hole 331; the telescope holder 40 has a vertically extended insertion hole 45 in the lower part 43; a horizontal adjustment screw 91 is inserted through the horizontally extended insertion hole 331 and threaded into the horizontally extended screw hole 911 of the base block 61 and a vertical adjustment screw 93 is inserted through the vertically extended insertion hole 45 and threaded into the vertically extended screw hole 933 of the base block 61; a horizontal adjustment member 951 is fastened to the horizontal adjustment screw 91 for rotating the horizontal adjustment screw 91 to move the base block 61 horizontally relative to the camera platform 30; a vertical adjustment member 952 is fastened to the vertical adjustment screw 93 for rotating the vertical adjustment screw 93 to move the base block 61 vertically relative to the telescope holder 40.

Further, the bottom mounting plate 439 may be eliminated, and the screw hole 437 may be directly formed in the bottom side of the lower part 43 of the telescope holder 40.

Although the present invention has been explained in relation to its preferred embodiments, it is to be understood that many other possible modifications and variations can be made without departing from the spirit and scope of the invention as hereinafter claimed.

What is claimed is:

1. An adjustable optical apparatus adapter, comprising:
a camera platform adapted to carry a camera, comprising a mounting screw adapted to affix a camera to said camera platform, and at least one horizontal sliding slot;
a telescope holder adapted to hold a telescope, having an upper part forming a holder frame and a lower part defining a vertical sliding slot, said holder frame having at least one screw hole vertically extended in a top side thereof;

a lock screw threaded into the screw hole of said holder frame and adapted to lock a telescope to said holder frame; and a camera platform lock mounted in the at least one horizontal sliding slot of said camera platform and the vertical sliding slot of said telescope holder for enabling said camera platform to be moved vertically relative to said telescope holder along said vertical sliding slot and said telescope holder to be moved horizontally relative to said camera holder along said at least one horizontal sliding slot and adapted to lock said camera platform to said telescope holder, said camera platform lock including:

(a) a base block, said base block including a polygonal shoulder inserted into said at least one horizontal sliding slot of said camera platform for enabling said base block to be moved along said at least one horizontal sliding slot and for stopping said base block from rotary motion relative to said camera platform, and a screw rod forwardly extending from said polygonal shoulder and inserted through said vertical sliding slot of said telescope holder; and (b) a fastening member threaded onto the screw rod of said base block and adapted to affix said camera platform to said telescope holder.

2. The adjustable optical apparatus adapter as claimed in claim 1, wherein said camera platform lock further comprises a screw hole axially formed in the screw rod of said base block, a screw fastened to the screw hole in the screw rod of said base block to secure said fastening member to the screw rod of said base block, a slide mounted on the screw rod of said base block between said telescope holder and said fastening member and adapted to guide movement of said base block along said vertical sliding slot of said telescope holder, and an ornamental cap capped on said fastening member.

3. The adjustable optical apparatus adapter as claimed in claim 2, wherein said telescope holder comprises at least one vertical sliding groove arranged in parallel to said vertical sliding slot; said slide comprises a polygonal center opening coupled to said polygonal shoulder of said base block, and at least one vertical coupling flange respectively coupled to the at least one vertical sliding groove of said telescope holder for guiding movement of said base block along the vertical sliding slot of said telescope holder.

4. The adjustable optical apparatus adapter as claimed in claim 1, wherein said camera platform comprises at least one horizontal sliding groove; said base block of said camera lock comprises at least one horizontal coupling flange respectively coupled to the at least one horizontal sliding groove to guide movement of said base block along said at least one sliding slot of said camera platform.

5. The adjustable optical apparatus adapter as claimed in claim 1, wherein said camera platform further comprises a wing nut threaded onto said mounting screw and stopped between said mounting screw and a bottom wall of said camera platform.

6. The adjustable optical apparatus adapter as claimed in claim 1, wherein said camera platform further comprises a horizontally extended insertion hole; said camera platform lock further comprises a horizontally extended screw hole formed in said base block and extended through two opposite sides of said base block, and a horizontal adjustment screw inserted through the horizontally extended insertion hole of said camera platform and threaded into the horizontally extended screw hole in said base block for rotation by the user to move said base block horizontally along said at least one horizontal sliding slot of said camera platform.

7. The adjustable optical apparatus adapter as claimed in claim 6, wherein said telescope holder further comprises a vertically extended insertion hole in the lower part thereof; said camera platform lock further comprises a vertically extended screw hole formed in said base block and extended through top and bottom sides of said base block, and a vertical adjustment screw inserted through the vertically extended insertion hole in the lower part of said telescope holder and threaded into the vertically extended screw hole in said base block for rotation by the user to move said base block vertically along said vertical sliding slot of said telescope holder.

8. An adjustable optical apparatus adapter, comprising:

a camera platform adapted to carry a camera, comprising a mounting screw adapted to affix a camera to said camera platform, and at least one horizontal sliding slot;

a telescope holder adapted to hold a telescope, having an upper part forming a holder frame and a lower part defining a vertical sliding slot, said holder frame having at least one screw hole vertically extended in a top side thereof;

a lock screw threaded into the screw hole of said holder frame and adapted to lock a telescope to said holder frame;

a camera platform lock mounted in the at least one horizontal sliding slot of said camera platform and the vertical sliding slot of said telescope holder for enabling said camera platform to be moved vertically relative to said telescope holder along said vertical sliding slot and said telescope holder to be moved horizontally relative to said camera holder along said at least one horizontal sliding slot and adapted to lock said camera platform to said telescope holder; and a holding down frame fastened to said lock screw and suspended inside said frame holder and vertically movably controlled by said lock screw to hold down a telescope in said frame holder.

9. The adjustable optical apparatus adapter as claimed in claim 8, wherein said lock screw has a locating groove extended around the periphery of a front end thereof; said holding down frame comprises a top mounting hole, which receives the front end of said lock screw, a front screw hole perpendicularly extended from said top mounting hole to a front side thereof, and a tightening up screw threaded into the front screw hole of said holding down frame and engaged into the locating groove of said lock screw to affix said holding down frame to said lock screw.

10. The adjustable optical apparatus adapter as claimed in claim 8, further comprising a plurality of anti-skid pads respectively fastened to an inner bottom wall of said holder frame and a bottom wall of said holding down frame for holding down a telescope in between said holder frame and said holding down frame.

11. The adjustable optical apparatus adapter as claimed in claim 8, wherein said holder frame comprises at least one vertically extended sliding rail; said holder frame comprises at least one vertically extended coupling groove respectively coupled to said at least one vertically extended sliding rail of said holder frame to guide vertical movement of said holding down frame within said holder frame.

* * * * *